J. McCAFFREY.
Journal-Bearings.

No. 150,067.　　　　　　　　　　Patented April 21, 1874.

Witnesses:
Harry Smith
Thomas McIlvain

James McCaffrey
By his Attys.
Howson and Son.

UNITED STATES PATENT OFFICE.

JAMES McCAFFREY, OF PHILADELPHIA, PENNSYLVANIA.

IMPROVEMENT IN JOURNAL-BEARINGS.

Specification forming part of Letters Patent No. 150,067, dated April 21, 1874; application filed February 21, 1874.

*To all whom it may concern:*

Figure 1:
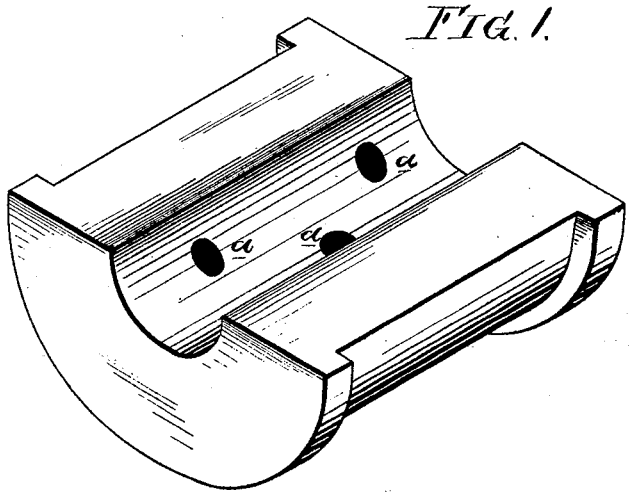
Figure 2:
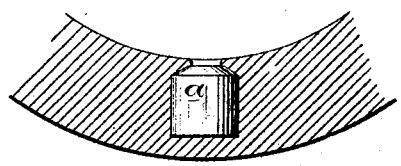

Be it known that I, JAMES McCAFFREY, of Philadelphia, Pennsylvania, have invented an Improvement in Journal-Bearings, of which the following is a specification:

The object of my invention is to render journal-bearings more durable than those in common use by means of studs or small blocks *a* of hard or chilled or case-hardened iron, the said studs being fitted into the bearings, as shown in the perspective view, Figure 1, and enlarged vertical section, Fig. 2, of the accompanying drawing.

I prefer to make the studs of iron cast in chills; but a very hard, light-gray pig-iron, such as is used for the grinding-surfaces of mills and other analogous purposes, may be used without being cast in chills; or the studs may be made of wrought-iron case-hardened, or even of hardened steel. Holes are drilled or otherwise formed in the bearing at points where the latter is subjected to the greatest wear. In the small bearing, Fig. 1, for instance, there are five holes, so dispersed that when they have received the hard studs, the latter will be in the most favorable position to resist the wearing effect of the journal. The holes are drilled to a depth slightly exceeding the thickness of the studs, so that the journal of the shaft to which the bearing is adapted will not, in the first instance, be in absolute contact with the studs; but, as the softer metal of the bearing wears away, the journal will come in contact with the studs, and which will be very slowly worn, and will finally conform to the journal, and will at the same time arrest the rapid wearing away to which the softer metal of the bearing would be subjected but for the presence of the studs.

I have found that much better results can be obtained by thus depressing the studs slightly below the surface of the bearing in the first instance than by making them on a level with the same. In practice I make the upper edge of each stud slightly beveled, and after the introduction of the stud into the recess I hammer down the metal over this beveled edge, as shown in Fig. 2, thus retaining the stud in its place while the bearing is being bored. The boring-tool, however, should not be permitted to come in absolute contact with the studs.

I am aware that it has been a common practice to cast into recesses in a bearing of comparatively soft metal strips of harder metal. I therefore make no broad claim to such a combination; but

I claim as my invention—

A bearing in which studs or blocks *a* of hard iron or steel are fitted into holes deeper than the studs are thick, as and for the purpose specified.

In testimony whereof I have signed my name to this specification in the presence of two subscribing witnesses.

JAMES McCAFFREY.

Witnesses:
 WM. A. STEEL,
 HARRY SMITH.